United States Patent
Parthasarathy et al.

(10) Patent No.: US 9,036,656 B1
(45) Date of Patent: May 19, 2015

(54) LIGHTWEIGHT RELIABILITY PROTOCOL OVER FIBRE-CHANNEL TO PROVIDE FOR LOAD-BALANCING AND RESILIENCY

(75) Inventors: Anand Parthasarathy, Fremont, CA (US); Vijay Chander, San Ramon, CA (US); Surekha Puttasubbappa Chandrashekarappa, Bangalore (IN); Kartikeya Chandrayana, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 820 days.

(21) Appl. No.: 12/792,168

(22) Filed: Jun. 2, 2010

(51) Int. Cl.
H04L 12/723 (2013.01)
H04L 12/861 (2013.01)
H04L 12/931 (2013.01)

(52) U.S. Cl.
CPC .............. *H04L 45/50* (2013.01); *H04L 49/90* (2013.01); *H04L 49/00* (2013.01)

(58) Field of Classification Search
CPC ..... H04L 43/00; H04L 43/50; H04L 43/0852; H04L 47/10; H04L 12/2697; H04L 49/90; H04L 1/188; H04L 45/50
USPC ......................................................... 370/474
See application file for complete search history.

(56) References Cited

U.S. PATENT DOCUMENTS

| | | | |
|---|---|---|---|
| 7,769,023 B2 | 8/2010 | Parthasarathy et al. | |
| 2001/0027486 A1* | 10/2001 | Takamoto et al. | 709/227 |
| 2002/0091898 A1* | 7/2002 | Matsunami et al. | 711/114 |
| 2003/0021239 A1* | 1/2003 | Mullendore et al. | 370/276 |
| 2003/0202472 A1* | 10/2003 | Kalkunte et al. | 370/235 |
| 2003/0217130 A1* | 11/2003 | Tang et al. | 709/223 |
| 2005/0010849 A1 | 1/2005 | Ryle et al. | |
| 2007/0165643 A1* | 7/2007 | Mooney et al. | 370/394 |
| 2009/0213861 A1* | 8/2009 | Benner et al. | 370/400 |
| 2010/0077141 A1* | 3/2010 | Achler | 711/108 |

* cited by examiner

*Primary Examiner* — Jason Mattis
*Assistant Examiner* — Stephen J Clawson
(74) *Attorney, Agent, or Firm* — Edell, Shapiro & Finnan, LLC (57) ABSTRACT

Techniques are provided for transmitting a plurality of Fiber-Channel packets in an FC network. A reliability protocol header comprising reliability attributes and FC attributes are prepended to the FC packets prior to their transmission for each packet in an exchange block comprising a plurality of FC packets. The FC packets are transmitted with the reliability protocol header across the FC network for delivery to a destination device.

17 Claims, 9 Drawing Sheets

LIGHTWEIGHT RELIABILITY PROTOCOL OVER FIBRE-CHANNEL TO PROVIDE FOR LOAD-BALANCING AND RESILIENCY

TECHNICAL FIELD

The present disclosure relates to network interface devices and systems and more particularly to acceleration services in network systems.

BACKGROUND

Current data communication techniques, such as Fibre-Channel (FC) and FC over Internet Protocol (FCIP) Write Acceleration and FCIP Tape Acceleration have certain restrictions as the intelligence is associated with the end-points of a metropolitan area network (MAN)/wide area network (WAN) inter-switch links (ISLs). Write acceleration techniques allow for port-channels but not equal-cost multi-path (ECMP) links. Tape-acceleration techniques that extend across FC exchanges do not allow for port-channels.

Acceleration services solve these limitations by abstracting protocol intelligence out of the end-points of the ISLs, placing them in service engines in the fabric and redirecting the traffic flows that need to be accelerated to these service engines. This makes the service topology independent and allows for multiple parallel links (port-channels or ECMP).

Acceleration services are useful for applications such as remote replications or tape vaulting for disaster recovery. Such applications require high resiliency and increased performance. In order to satisfy these requirements, the acceleration service provides high resiliency against failures of the ISLs in a MAN or WAN, and optimally utilize the available MAN/WAN ISL bandwidth, even if it is an aggregate of multiple low-throughput links. End-user applications do not see any disruption in traffic if the MAN/WAN ISLs fail or are brought down for maintenance purposes as long as there is at least one available link that interconnects the two sites.

DESCRIPTION OF EXAMPLE EMBODIMENTS

Overview

Techniques are provided for transmitting a plurality of Fibre-Channel (FC) packets in an FC network. At a first interface device capable of transmitting a plurality of FC packets, for each packet in an exchange block comprising a plurality of FC packets, a reliability protocol header with reliability attributes and FC attributes is prepended to the FC packets prior to their transmission. The FC packets are transmitted with the reliability protocol header in the FC network for delivery to a second interface device. In general, the reliability protocol header is added to an FC payload. For example, a reliability protocol header may be prepended to (placed before) an FC payload. At the second interface device, the reliability protocol attributes are extracted from the reliability protocol header and the FC packets are processed based on the reliability protocol attributes to arrange the packets in proper order for further processing by an intended destination or target device.

Example Embodiments

A Lightweight Reliability Transport Protocol (LRTP) can be implemented over a Fibre-Channel (FC) network or over an FC over Internet Protocol (FCIP) network to provide a reliability protocol functionality, in-order delivery semantics, and optimal load-balancing for providing resiliency and data fault-tolerance. The underlying fundamentals of the LRTP are based on standard reliability protocols, such as the Transmission Control Protocol (TCP). For example, the LRTP can be implemented over two sites that are inter-connected across a metropolitan area network (MAN) or a wide area network (WAN) via FC or FCIP links. The acceleration service itself may be transport agnostic and used to provide the reliable transport over FC between the two acceleration service engines.

Figure 1:
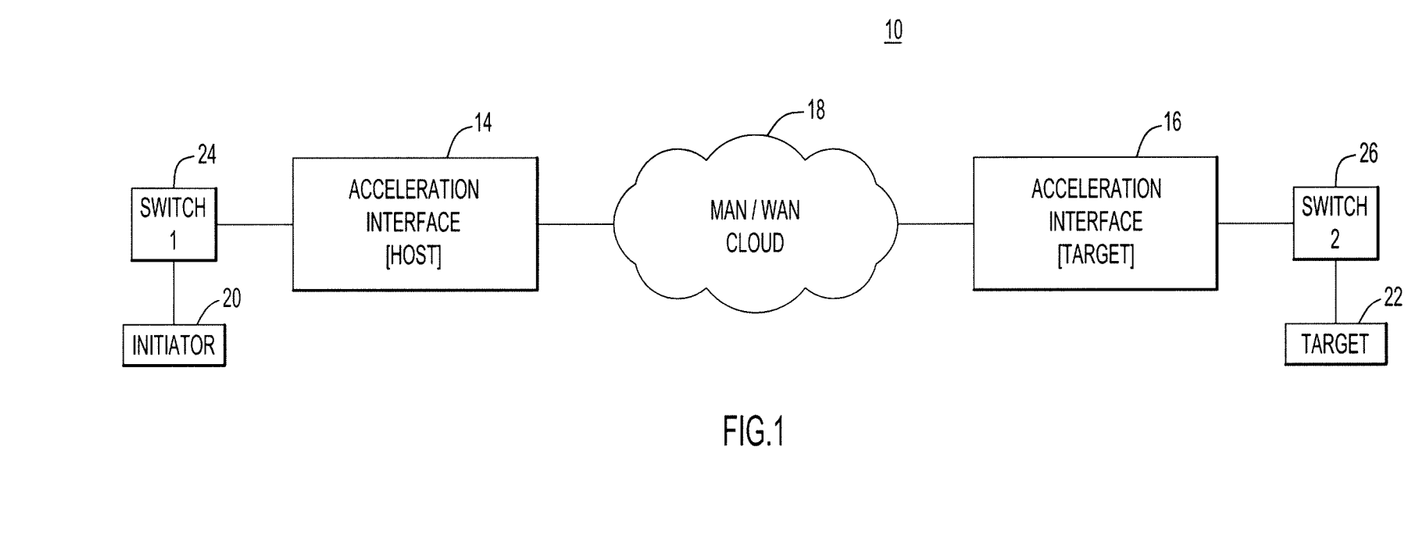
FIG. 1 is a block diagram showing an example of a network topology including an acceleration interface device on both ends of an FC network and configured to perform the enhanced reliability techniques described herein.

Referring first to FIG. 1, an example of a network topology that allows for highly reliable transmission and reception of data is shown at reference numeral 10. The network topology 10 comprises a host acceleration interface device 14 and a target acceleration interface device 16 which communicate with each other via inter-switch links (ISLs). For example, the ISLs may be FC links or FCIP links that are part of a MAN/WAN 18. There is a source device that, in the example shown in FIG. 1, serves as an initiator or source device 20 with respect to data to be delivered via the MAN/WAN 18 to a destination device identified as a target 22.

The initiator 20 may be any device capable of storing, transmitting and receiving data. For example, the initiator 20 may refer to a set of devices in a data-center. Similarly, the target 22 may be any device capable of storing, transmitting and receiving data information as well. For example, the initiator 20 could be a host or storage array and the target 22 may comprise a storage array or a tape library. In one example, the network topology 10 is used as an environment to provide remote replication of storage arrays and tape backups to vault the tapes in a common location. The host acceleration interface 14 and the target acceleration interface 16 are essentially the same devices, and each is capable of transmitting data across the MAN/WAN 18 and receiving data from the MAN/WAN 18. In addition, the host acceleration interface 14 is configured to receive data from the initiator 20 for formatting for transmission across the MAN/WAN 18 to the target 22, and the target acceleration interface 16 is configured to send data received from the host acceleration interface 14 over the MAN/WAN, for delivery to the target 22 respectively. Data is transmitted to and from the initiator 20 to the host acceleration interface 14 via a switch 24, and similarly, data is transmitted to and from the target 22 to the target acceleration interface 16 via a switch 26.

An acceleration service is used for transmission of data between the host acceleration interface 14 and the target acceleration interface 16 across the MAN/WAN 18. The acceleration service is used for applications, such as remote replication or tape vaulting primarily for disaster recovery. The acceleration service is transport agnostic and provides reliable transport over the FC network (embodied in the MAN/WAN 18) between the host acceleration interface 14 and the target acceleration interface 16. In one example, the acceleration service could be a Write acceleration service. In another example, the acceleration service may be a Tape acceleration service, where the target 22 is a tape device.

The LRTP can be implemented over the FC network or FCIP network. The LRTP assumes that the underlying infrastructure is predominantly lossless and stable with the exception of natural failures such as failures of ISLs, hardware/software failures or user-initiated shutdown of ISLs for maintenance reasons. This is common for the FC fabric whether it is connected via FC or FCIP. The LRTP is optimized with this assumption and can provide improved performance for the acceleration service. Additionally, the LRTP can be implemented anywhere in the FC fabric between two acceleration interfaces and the FC packets may be enhanced with reliability protocol attributes for traversing through switches in the FC fabric, particularly when the switches are of different vendors or manufacturers.

Figure 2:
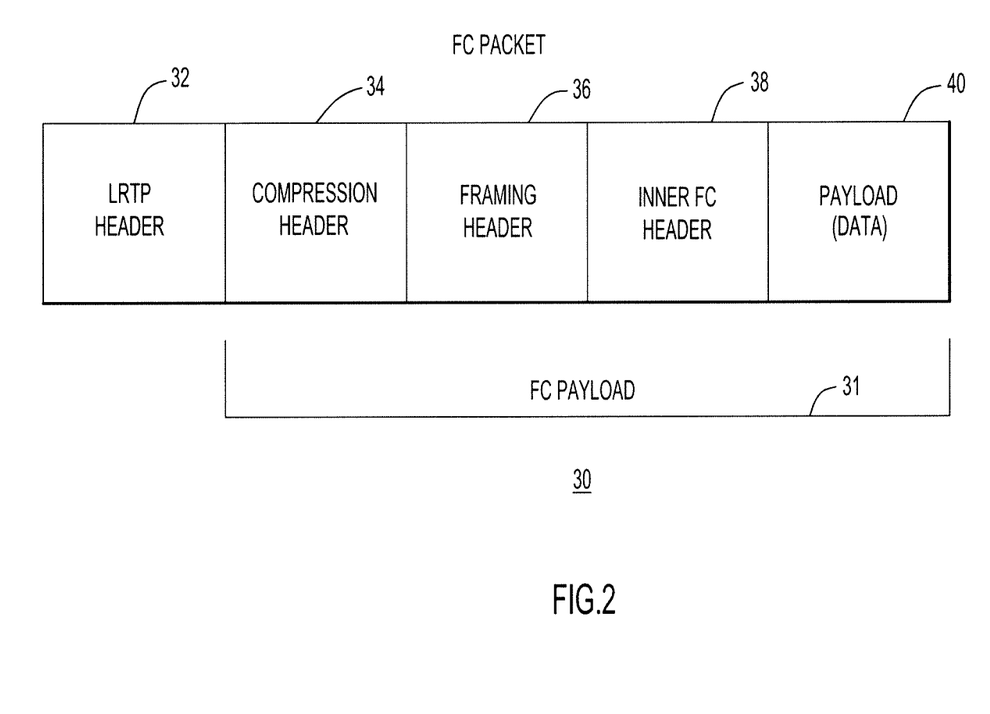
FIG. 2 is a diagram showing an example of an FC packet capable of being transmitted over an FC or FCIP network.

The example implementations described herein disclose techniques for reliable data transfer over ISLs in an FC network. Turning to FIG. 2, an FC packet is shown at reference numeral 30. In one example, the FC packet 30 is configured to be transmitted over an FC network. In another example, the FC packet 30 is configured to be transmitted over an FCIP network. The FC packet 30 comprises an LRTP header 32, a compression header 34, a framing header 36, an inner FC header 38, and a payload 40. The FC packet 30 is configured for transmission through the MAN/WAN 18 shown in FIG. 1. In one example, the host acceleration interface 14 receives data from the initiator 20, generates an FC packet 30 as shown in FIG. 2 and sends the FC packet 30 to the target acceleration interface 16. In another example, the target host acceleration interface 16 receives data from the target 22, generates an FC packet as shown in FIG. 2 and sends the FC packet 30 to the host acceleration interface 14. The compression header 34, framing header 36, inner FC header 38, and payload 40 are part of an FC payload 31 for the FC packet 30.

When compression is enabled, the compression header 34 may be used to compress the payloads that are received from the initiator or the target before transmitting the FC packet 30 on the ISLs in the MAN/WAN 18. The compression header 34 may also be used to help ensure the data integrity during transmission. In one example a compression header 34 may be 4 bytes. A framing header 36 may be used when compression is enabled and this framing header may contain a length field indicating the size of FC packet 31. In one example, the framing header 36 may be 16 bytes. The inner FC header 38 may be used when compression is enabled. For example, a 4 byte frame header may be prefixed to every FC payload 31 being added to a pre-compression queue. The inner FC header 38 may also be used to indicate the size FC payload 31 and to identify frame boundaries. In one example, the inner FC header 38 may be 24 bytes. The payload 40 may contain any data information that is being transmitted in the FC packet.

In one example, when compression is enabled, a plurality of payloads that are received from the initiator or target are batched together. The payloads are compressed and compression header 34 is added. A framing header 36 is also added to delineate the batched payloads.

The LRTP header 32 is configured to retain FC fields that are necessary for routing the FC packet 30 from the host acceleration interface 14 to the target acceleration interface 16 through the MAN/WAN 18. In particular, the LRTP header 32 provides for reliable and in-order delivery of a plurality of FC packets 30 across the MAN/WAN 18. In one example, the LRTP header is prepended to an outer (front) end of the FC packet 30 upon egress from the host acceleration interface 14 and is removed by the target acceleration interface 16. In another example, the LRTP header may be appended to an outer (tail) end of the FC packet 30.

Figure 3:
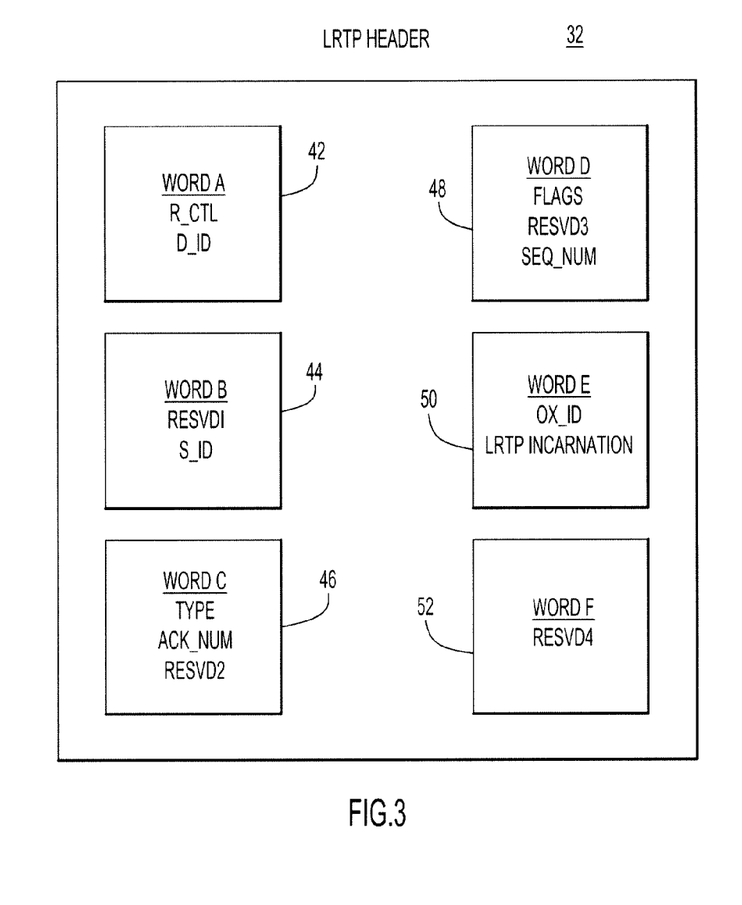
FIG. 3 is a diagram showing an example of the fields of a light weight reliability protocol header that is added to an FC packet.

Turning to FIG. 3, an example of the LRTP header 32 is shown with FC related and reliability information or attributes. The LRTP header 32 comprises six words having various fields of information. For example, word A identified by reference numeral 42 of the LRTP header 32 comprises a destination identifier (D_ID) field, word B identified by reference numeral 44 of the LRTP header 32 comprises a source identifier (S_ID) field, and word E identified by reference numeral 50 of the LRTP header 32 comprises an originator exchange identifier (OX_ID) field. In one example, the LRTP header is 24 bytes.

In one example, the S_ID and D_ID in the LRTP header 32 is preserved from the FC payload 31 for routing purposes, and are just moved to the LRTP header 32. The FC fabric allows for exchange based load-balancing (using, for example, S_ID, D_ID, and OX_ID in the LRTP header 32). In one example, the OX_ID in the LRTP header 32 is used by the FC fabric to achieve efficient load-balancing across multiple ISLs, as described further hereinafter. The remaining fields of the words in FIG. 3 may be used to encode LRTP protocol fields. For example, an acknowledgement number (ACK_NUM) in word C identified by reference numeral 46 and the sequence number (SEQ_NUM) in word D identified by reference numeral 48 may be used to encode LRTP protocol fields. Word F identified by reference numeral 52 is reserved.

Figure 4:
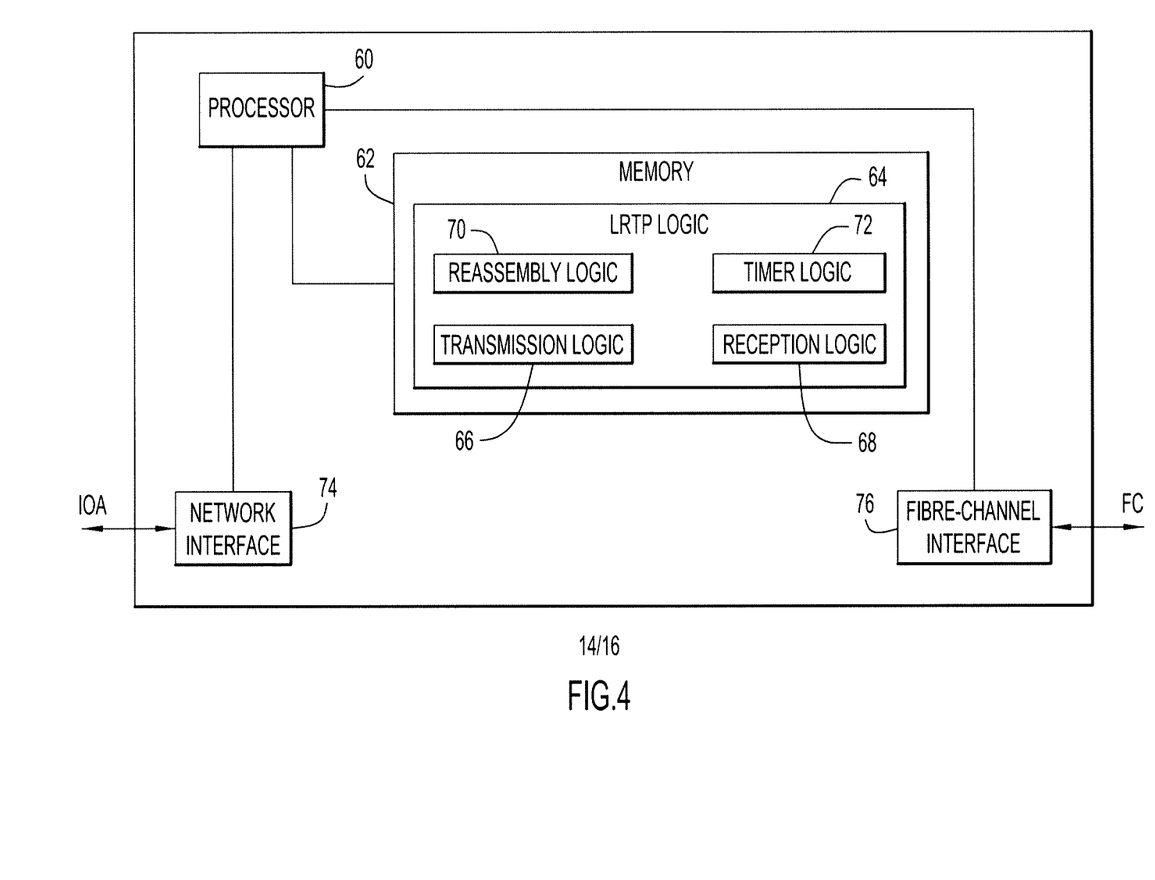
FIG. 4 is an example of a block diagram of an acceleration interface device configured to perform the enhanced reliability techniques.

Turning to FIG. 4, an example of a block diagram of an acceleration interface device is shown. The block diagram shown in FIG. 4 is representative of the host acceleration interface device 14 and the target acceleration interface device 16. For simplicity, the following description is made with respect to the host acceleration interface 14. The network interface 74 is configured to receive data from the initiator 20 through switch 24. The network interface 74 is configured to supply the received data from the initiator 20 to a processor 60. The processor 60 is capable of executing program logic instructions (i.e., software) for carrying out various operations and tasks described herein. For example, the processor 60 is capable of executing LRTP logic 64 to transmit, receive, reassemble, and retransmit FC packets 30. The functions of processor 60 may be implemented by logic encoded in one or more tangible media (e.g., embedded logic such as an application specific integrated circuit, digital signal processor instructions, software that is executed by a processor, etc), wherein memory 62 stores data used for the operations described herein and stores software or processor executable instructions that are executed to carry out the operations described herein. The LRTP logic 64 may take any of a variety of forms, so as to be encoded in one or more tangible computer readable memory media for execution, such as fixed logic or programmable logic (e.g., software/computer instructions executed by a processor) and the processor 60 may be an application specific integrated circuit (ASIC) that comprises fixed digital logic, or a combination thereof. For example, the processor 60 may be embodied by digital logic gates in a fixed or programmable digital logic integrated circuit, which digital logic gates are configured to perform the LRTP logic 64. In another form, the LRTP logic 64 may be embodied in a computer or processor readable memory medium that is encoded with instructions for execution by a processor (e.g. a processor 60) that, when executed by the processor, are operable to cause the processor to perform the operations described herein in connection with the LRTP logic 64. The FC interface 76 is configured to transmit and receive the FC packets 30 across the ISLs in the FC network.

The LRTP logic 64 shown in FIG. 4 comprises transmission logic 66, reception logic 68, reassembly logic 70 and timer logic 72. The LRTP logic 64 provides reliability and in-order delivery semantics within an acceleration service framework. The LRTP logic 64 may be useful in dealing with sporadic frame drops due to faulty ISLs or may be useful in dealing with ISL failure due to maintenance or any failures. One purpose of the LRTP is to make applications unaware of any topological failures or changes in the ISLs in the MAN/WAN 18. Another function of the LRTP is to make applications at the initiator and target unaware of transient failures due to port-channel membership changes. It should be understood that the LRTP logic 64 described herein is an example of one LRTP processing, and that LRTP logic 64 is not limited to the specific logic described herein.

In one example of the acceleration interface device in FIG. 4, data received through network interface 74 and is sent by the processor to an I/O accelerator (IOA) peer through the FC interface 76. The IOA service platform utilizes exchange based load-balancing in the FC fabric of the MAN/WAN 18 for maximum utilization of port-channels and equal-cost multiple paths (ECMP). Due to potential variation in latency across these links, packet reordering may be optimized as fast-path. The LRTP is similar to the TCP in terms of using sequence numbers and acknowledgement numbers for packets, and timers to provide reliability and in-order delivery semantics. The LRTP is optimized for sporadic drops, small or large, but not for periodic drops. The LRTP logic 64 prepends LRTP header 32 to a data packet that retains the FC fields necessary for routing the FC payloads and uses the remaining available fields to encode the LRTP attributes. In another example, the LRTP logic 64 appends the LRTP header 32 to (the tail end) of the FC packet.

The transmission logic 66 of the LRTP logic 64 is utilized to transmit FC packet 30 from the host acceleration interface 14 into the FC network of the MAN/WAN 18. Upon receipt of data, for example from initiator 20, an LRTP header is prepended to an end (the front end) of an FC payload 31 to create an FC packet 30 as depicted in FIG. 2. The relevant attributes in the LRTP data structure may be similar to TCP implementation that may include "send unacknowledged" (snd_una), "send next" (snd_nxt), and "receive next" (rcv_nxt). The sequence number, SEQ_NUM, in word D shown at 48 of LRTP header 32 in FIG. 3, for the data packet is snd_nxt, and the acknowledgement number, ACK_NUM, in word C shown at 46 of LRTP header 32 of FIG. 3, is rcv_nxt.

Once an FC packet 30 is transmitted, it is enqueued in a transmission queue (TXQ) list. The packets in the TXQ list are those that correspond from snd_una to snd_nxt that are waiting for an acknowledgement from the remote end. The transmission logic 66 causes a retransmission timer to be started and snd_nxt is incremented for the next data packet.

The reception logic 68 is used to receive FC packets from the MAN/WAN 18. Upon receipt of an FC packet 30, the LRTP header 32 of the FC packet 30 is parsed for relevant data attributes. For example, relevant attributes may be those in the FC packet 30 data structure corresponding to snd_una, snd_nxt, and rcv_nxt. Packets between snd_una and ACK_NUM are removed from the TXQ list and the reassembly logic 70 is used to process the packets, and snd_una is updated to the ACK_NUM. If there are more packets in the TXQ list, a new retransmission timer is started. The LRTP acknowledgment is sent indicating that the packet is received.

The reassembly logic 70 is used to arrange the FC packets 30 in order. The reassembly logic 66 determines whether a received FC packet 30 corresponds to rcv_nxt, and enqueues the packets in a receive list data structure until the packets are in-sequence prior to delivering the packets to the initiator 20 or, in the case of target acceleration interface 16, to the target 22. Reassembly logic 70 is optimized for performance.

Figure 5:
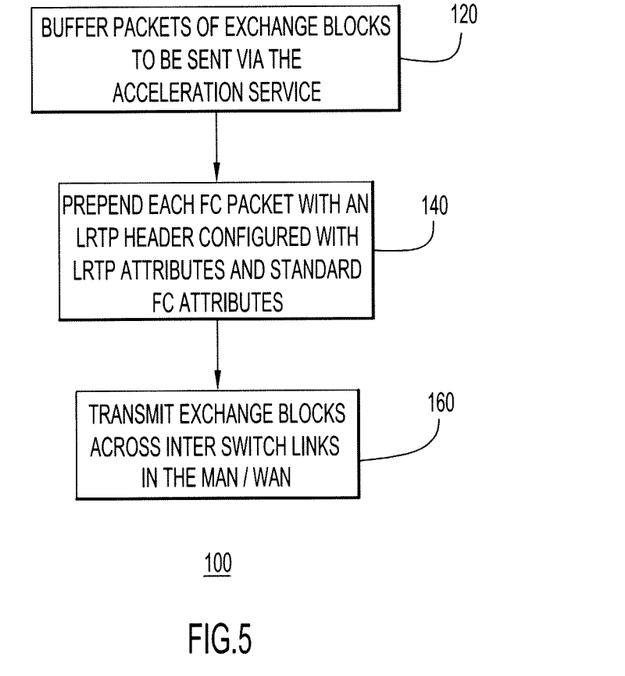
FIG. 5 is an example of a flow chart showing the operations performed at an acceleration interface device when transmitting FC packets over the FC or FCIP network.

Turning to FIG. 5, an example of a flow chart for a transmission operation shown at 100 of FC packets 30 over the FC network is now described. The transmission operation 100 is performed by execution of the transmission logic 56 shown in FIG. 4. An exchange block is defined as a group of data packets to be transmitted from a source to a destination. At 120, data packets are buffered into and grouped into exchange blocks. Each packet is formatted into an FC packet and at 140, an LRTP header is prepended to (the front end of) each FC packet, where the LRTP header is of the form shown in FIG. 3, including LRTP attributes and standard FC attributes. At 160, the exchange blocks are transmitted across the FC network in the MAN/WAN 18. As described hereinafter in connection with FIGS. 7 and 8, each exchange block is sub-divided into a plurality of exchange sub-blocks and at operation 140, the OX_ID in the LRTP header is set with a value to indicate that FC packets are part of a corresponding exchange sub-block. For example, each packet that is part of the same exchange sub-block has the same (and unique) OX_ID but packets that are part of different exchange sub-blocks have different OX_IDs.

Since the LRTP attributes are prepended to the FC packets, the concern for a lost or out-of-order packet is removed because the LRTP will handle the retransmission request and/or re-ordering of the packets at the receive side. A host acceleration interface 14 can transmit the exchange blocks without concern that the exchange blocks will be received out of order, even if the exchange blocks traverse different paths in the FC fabric. As a result, an exchange block can be transmitted by the host acceleration interface 14 across the MAN/WAN 18 without waiting for confirmation or acknowledgment that the previously transmitted exchange block was completely received by the target acceleration interface 16. In one example, an IOA proxies the status locally at the host acceleration interface 14, and the host acceleration interface 14 transmits another exchange block after the previous exchange block has been transmitted. The exchange blocks may be released sequentially from the host acceleration interface 14, but the host acceleration interface 14 does not have to wait for the entire round trip time (RTT) to transmit the next sequential exchange block. For example, this becomes the equivalent of having parallel exchanges emanating from the host acceleration interface 14, which is now able to utilize multiple ISLs.

Figure 6:
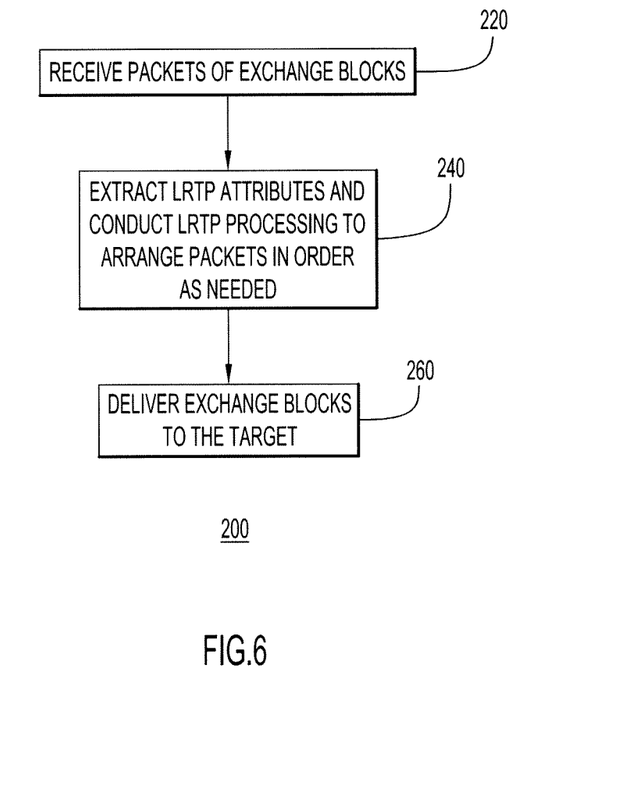
FIG. 6 is an example of a flow chart showing the operations performed at an acceleration interface device when receiving FC packets over the FC or FCIP network.

Turning to FIG. 6, an example of a flow chart for a reception operation 200 is now described. The reception operation 200 is performed by execution of the reception logic 68 shown in FIG. 4. Operation 220 involves receiving streams of FC packets 30 of an exchange block. In one example, the FC packets 30 may be received at the target acceleration interface 16 as an exchange block. When the FC packets 30 are received, operation 240 involves extracting LRTP attributes and conducting LRTP processing to arrange the FC packets 30 of an exchange block in-order as needed and to request retransmission for a missing packet as needed. The retransmission request and response exchanges are not shown because it is understood that it is part of the LRTP. At 260, the exchange blocks are delivered to the associated destination device, e.g., target 22 in the case of the target acceleration interface 16.

Figure 7:
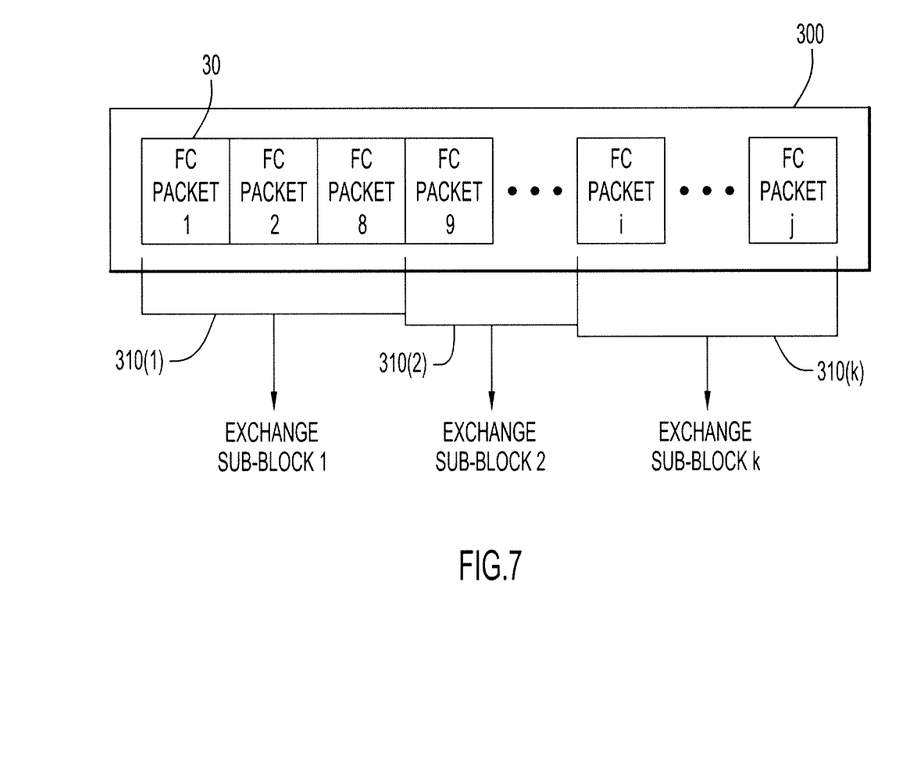
FIG. 7 is a diagram showing an example of an exchange block comprising a plurality of exchange sub-blocks each in turn comprising a plurality of FC packets and wherein the FC packets are configured to facilitate load balancing in the FC or FCIP network.

Turning to FIG. 7, an exchange block is shown at 300. As explained above, each exchange block 300 is sub-divided into a plurality of exchange sub-blocks shown at 310(1), 310(2), . . . 310(k). Each exchange sub-block comprises a predetermined number of packets, such as 8 packets, for example. An exchange block 300 is sub-divided into exchange sub-blocks to allow for a batch of packets to be transmitted across the ISLs in the MAN/WAN 18. When an exchange block is sub-divided into exchange sub-blocks, the OX_ID in word E 50 of the LRTP header 32 (FIG. 3) is set to an appropriate value to indicate that the packet is part of an exchange sub-block as described above. In one example, the OX_ID can be a random number as long as it is different for consecutive exchange sub-blocks.

Figure 8:
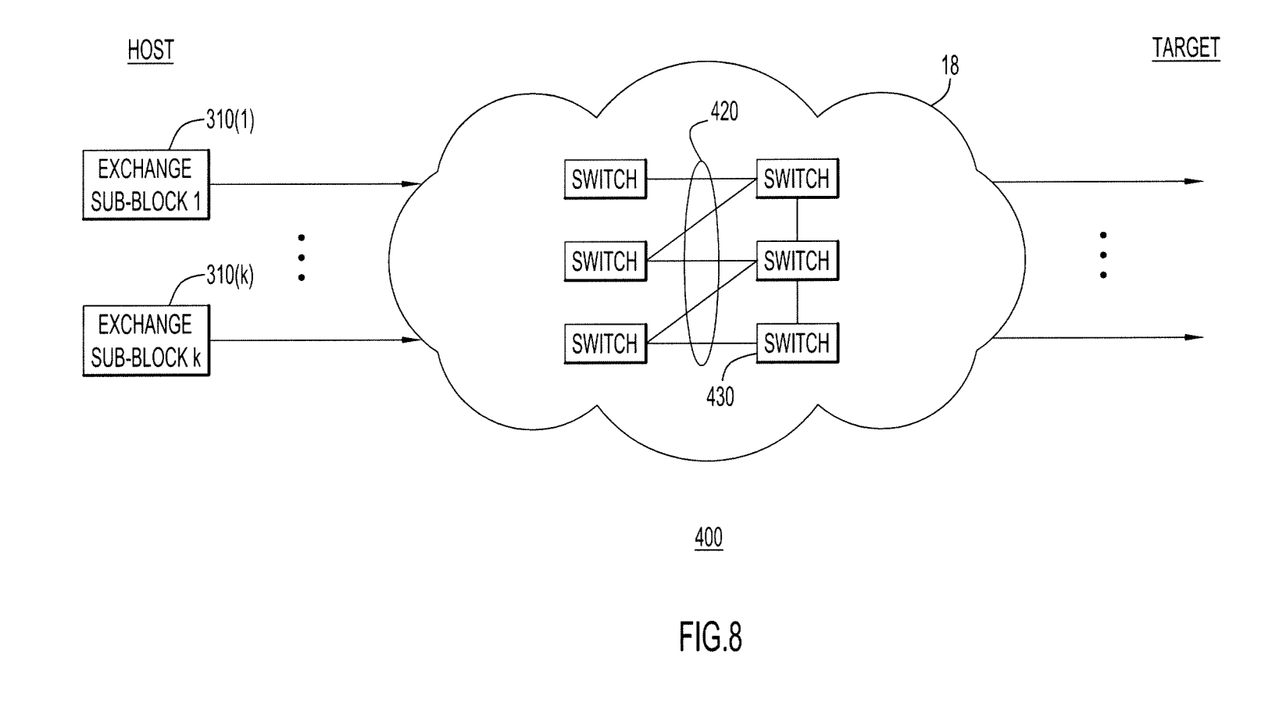
FIG. 8 is an example of a block diagram that illustrates the delivery of multiple exchange sub-blocks sub-divided to facilitate load balancing via multiple ISLs in the FC or FCIP network.

Turning to FIG. 8, exchange sub-blocks 310(1)-310(k) are transmitted from the host acceleration interface 14 over a plurality of ISLs 420 to a target acceleration interface 16. The exchange sub-blocks 310 of exchange block 300 can be transmitted by the host acceleration interface 14 across the ISLs between switches 430 in the MAN/WAN 18 without waiting for the status of exchange sub-blocks 310 that have been previously transmitted.

The FC fabric provides exchange-based load balancing to achieve an optimal load balancing. When the FC packets enter a given switch in the FC or FCIP network, there are multiple paths on which the FC packets can be transmitted. The FC fabric computes a hash computation, for example, of S_ID, D_ID, and OX_ID, and uses the results of the hash computation to determine the ISL on which the FC packet is sent. In one example, all of the FC packets in a given exchange block will take one path, while packets in different exchange blocks may take different paths. The OX_ID value is established to ensure that FC packets within an exchange sub-block take a given path, while packets in different exchange sub-blocks take different paths. In other words, the OX_ID value for packets in one exchange sub-block are set to be the same, but different from the OX_ID value set for packets in anther exchange sub-block. For example, the OX_ID is computed randomly from one sub-block to the next. As a result, the FC fabric will direct packets within an exchange sub-block on the same path, but different from the path used for packets in another exchange sub-block.

Figure 9:
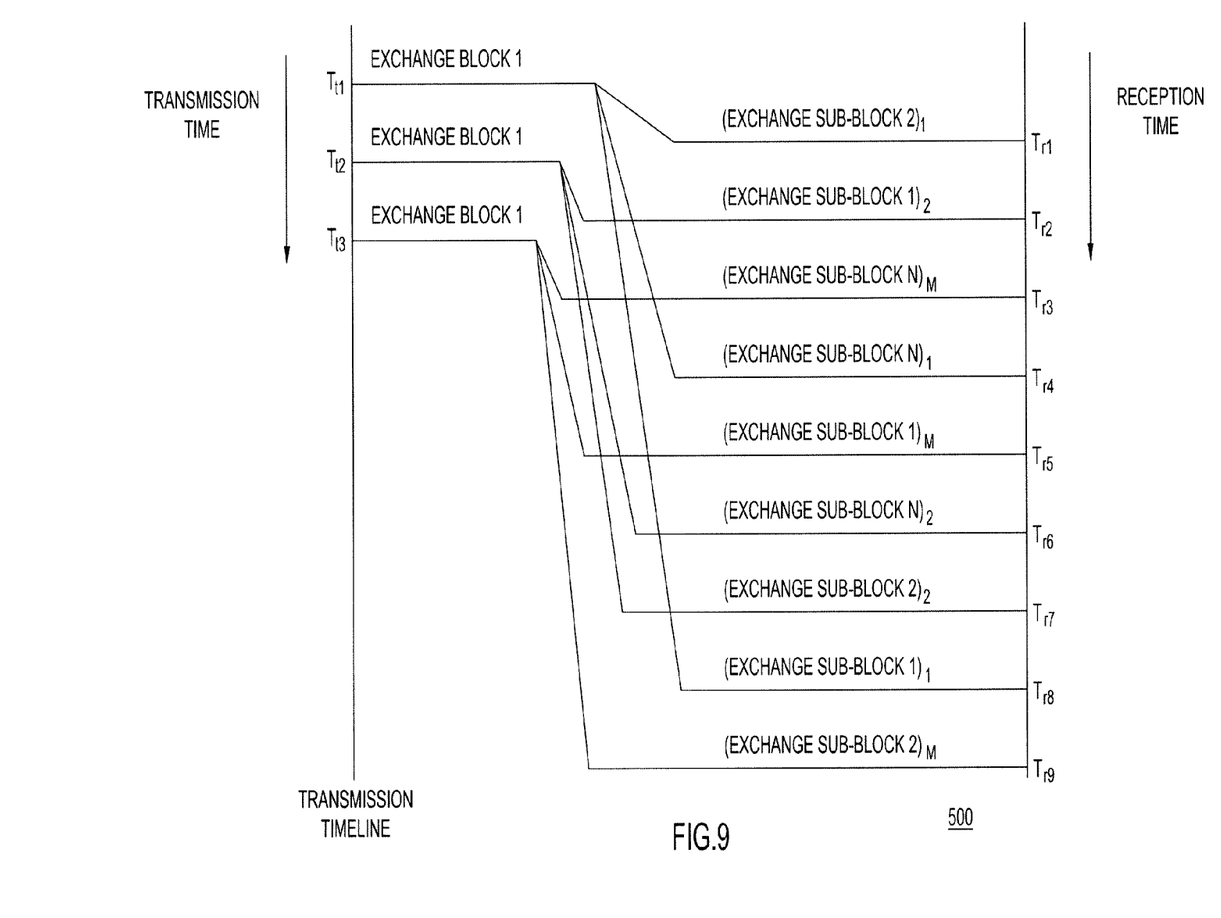
FIG. 9 is an example of a transmission timeline and a reception timeline of exchange blocks and exchange sub-blocks sent over the FC or FCIP network.

Turning to FIG. 9, an example of a transmission timeline and a reception timeline of exchange blocks and exchange sub-blocks in shown in reference 500. In this example, on the transmission timeline, the exchange blocks and exchange sub-blocks are transmitted in sequential order, for example, from exchange block 1, exchange block 2, to exchange block M, where each exchange block comprises multiple exchange sub-blocks. On the reception timeline, the exchange sub-blocks may be received out-of-order. For example, exchange sub-blocks of one exchange block are received before other exchange sub-blocks of other exchange blocks that were sent earlier in time. For example, in FIG. 9, exchange sub-block 1 for exchange block 2 is received at a time $T_{r2}$ which is before the time $T_{r8}$ when exchange sub-block 1 for exchange block 1 is received. In this example, the exchange sub-block for exchange block 2 is received before the exchange sub-block for exchange block 1 even though exchange block 1 was transmitted at time $T_{t1}$, before the transmission time of exchange block 2, $T_{t2}$.

When exchange sub-blocks are being transmitted, the exchange sub-blocks are transmitted from the host acceleration interface 14 without waiting the entire RTT to transmit the next sequential exchange sub-block in the exchange block. In this example, load-balancing can happen in a much more granular and smoother fashion. For example, if the exchange block is 256 kilobytes, the exchange block can be divided into multiple 32 kilobyte exchange sub-blocks to achieve better load-balancing. In another example, an exchange block can be sub-divided into more sub-blocks each comprising less FC packets, with each sub-block using a different OX_ID value to achieve even better, more-refined, load balancing.

This is to be contrasted with other transmission schemes in which despite the number of available links between the two sites, only one link at any given time is used because each exchange block is sent only after the previous exchange block has been completely transmitted. Given that each exchange block maps to an FC exchange, even with (S_ID, D_ID, OX_ID) load-balancing, a different link may be used for every exchange block but only one link is used at any given time as only one outstanding FC exchange (or SCSI I/O) exists at any given time. This is much slower than would be desired and the techniques described herein substantially improve on these schemes.

In sum, an apparatus is provided comprising a network interface device, a processor and an FC interface device. The network interface device is configured to receive a plurality of data packets from a source device for transmission over an FC network. The processor is configured to add (e.g., append, or more specifically, prepend) a reliability protocol header to the data packets prior to their transmission, the reliability protocol header comprising reliability attributes and FC attributes, to produce FC packets, and to transmit the FC packets with the prepended reliability protocol header across the FC network. The processor allocates or arranges the packets into exchange blocks each comprising a plurality of FC packets. An FC interface device is provided that is configured to transmit the plurality of exchange blocks of FC packets over the FC network.

Similarly, a tangible computer readable memory medium is provided that stores or is encoded with instructions that, when executed by a processor, cause the processor to: add (e.g., append, or more specifically, prepend) a reliability protocol header to a plurality of Fibre-Channel (FC) packets in an exchange block prior to their transmission in an FC network, the reliability protocol header comprising reliability protocol attributes and FC attributes; and transmit the FC packets with the reliability protocol header across the FC network for delivery to a destination device.

The above description is intended by way of example only. Various modifications and structural changes may be made therein without departing from the scope of the concepts described herein and within the scope and range of equivalents of the claims.

What is claimed is:

1. A method comprising:
    at a first interface device, receiving a plurality of data packets from a source device for transmission over a Fibre-Channel (FC) network;
    prepending a reliability protocol header to data packets prior to their transmission to produce enhanced FC packets in exchange blocks, each exchange block comprising a plurality of enhanced FC packets, and wherein the reliability protocol header comprises reliability protocol attributes and FC attributes both of which are used to ensure in-order arrangement of the enhanced FC packets as the enhanced FC packets are received by a device in a FC network;
    at the first interface device, transmitting the enhanced FC packets with the prepended reliability protocol header across the FC network for delivery to a second interface device to cause the second interface device to evaluate the reliability protocol header and the FC attributes to arrange the packets in a proper order;
    sub-dividing each exchange block into exchange sub-blocks comprising a plurality of enhanced FC packets; and
    setting an originator exchange identifier in the reliability protocol header of the enhanced FC packets of each exchange sub-block such that a same originator exchange identifier is assigned to enhanced FC packets that are part of a same exchange sub-block but a different originator exchange identifier is assigned to enhanced FC packets of different exchange sub-blocks.

2. The method of claim 1, further comprising transmitting the exchange sub-blocks of an exchange block through the network to the second interface device without waiting for confirmation that all the enhanced FC packets of a previously transmitted exchange sub-block have been received by the second interface device.

3. The method of claim 1, wherein transmitting comprises transmitting multiple exchange blocks through the FC network to the second interface device without waiting for confirmation that all the enhanced FC packets of a previously transmitted exchange block have been received by the second interface device.

4. The method of claim 1, wherein prepending comprises prepending the reliability protocol header to a data packet as an outermost header.

5. The method of claim 1, wherein prepending comprises prepending the reliability protocol header containing an acknowledgement number and a sequence number.

6. The method of claim 1, wherein transmitting comprises transmitting exchange blocks that are tape backup data to be sent from the first interface device to the second interface device using an acceleration service in a storage area network.

7. The method of claim 1, wherein transmitting comprises transmitting the enhanced FC packets, each containing the reliability protocol header, a compression header, a framing header, an inner FC header, and a payload.

8. A method comprising:
    at an interface device configured to connect to a Fibre-Channel (FC) network, receiving a plurality of enhanced FC packets that are part of an exchange block sent from a source interface device over the network;
    extracting reliability protocol attributes included in a reliability protocol header of the enhanced FC packets and used to ensure in-order arrangement of the enhanced FC packets;
    processing the enhanced FC packets using both a reliability protocol based on the reliability protocol attributes and FC attributes to arrange the enhanced FC packets in proper order for further processing;
    receiving exchange sub-blocks each comprising a plurality of enhanced FC packets; and
    evaluating an originator exchange identifier in the reliability protocol header of the enhanced FC packets of each exchange sub-block such that a same originator exchange identifier is grouped with enhanced FC packets that are part of a same exchange sub-block while a different originator exchange identifier is grouped with enhanced FC packets of corresponding different exchange sub-blocks.

9. The method of claim 8, wherein receiving comprises receiving enhanced FC packets associated with one exchange block prior to having received all the enhanced FC packets for a previously transmitted exchange block.

10. The method of claim 8, wherein each exchange block comprises a plurality of exchange sub-blocks, and wherein receiving comprises receiving an exchange sub-block prior to having received all the enhanced FC packets for a previously transmitted exchange sub-block.

11. The method of claim 8, further comprising re-ordering the enhanced FC packets as needed and delivering the enhanced FC packets to a target device after the enhanced FC packets are arranged in proper order.

12. An apparatus comprising:
    a network interface device configured to receive a plurality of data packets from a source device for transmission over a Fibre-Channel (FC) network;
    a processor configured to:
        prepend a reliability protocol header to the data packets to produce enhanced FC packets, the reliability protocol header comprising reliability attributes and FC attributes both of which are used to ensure in-order arrangement of the enhanced FC packets as the enhanced FC packets are received by a device in the FC network, and to group the enhanced FC packets into exchange blocks each comprising a plurality of enhanced FC packets;
        sub-divide each exchange block into a plurality of exchange sub-blocks each comprising a plurality of enhanced FC packets; and
        set an originator exchange identifier in the reliability protocol header of the enhanced FC packets in each exchange sub-block such that the same originator exchange identifier is assigned to enhanced FC packets that are part of the same exchange sub-block but a different originator exchange identifier is assigned to enhanced FC packets of different exchange sub-blocks; and
    an FC interface device configured to transmit the plurality of exchange blocks over the FC network to a destination device to cause the destination device to evaluate the reliability protocol header and the FC attributes to arrange the packets in a proper order.

13. The apparatus of claim 12, wherein the processor is configured to supply multiple exchange blocks to the FC interface device for transmission through the FC network without waiting for confirmation that all the enhanced FC packets of a previously transmitted exchange block have been received by an intended destination device.

14. A non-transitory computer readable memory medium storing instructions that, when executed by a processor, cause the processor to:
    prepend a reliability protocol header to a plurality packets to produce enhanced Fibre-Channel (FC) packets in an exchange block, prior to their transmission in an FC network, the reliability protocol header comprising reliability protocol attributes and FC attributes both of which are used to ensure in order arrangement as the enhanced FC packets are received by a device in the FC network;

sub-divide each exchange block into a plurality of exchange sub-blocks, set an originator exchange identifier in the reliability protocol header of the enhanced FC packets of each exchange sub-block such that the same originator exchange identifier is assigned to enhanced FC packets that are part of the same exchange sub-block but a different originator exchange identifier is assigned to enhanced FC packets of different exchange sub-blocks; and transmit the enhanced FC packets with the prepended reliability protocol header across the FC network for delivery to a destination device to cause the destination device to evaluate the reliability protocol header and the FC attributes to arrange the packets in a proper order.

15. The non-transitory computer-readable memory medium of claim 14, wherein the instructions that cause the processor to prepend the reliability protocol further comprise instructions that cause the processor to prepend the reliability protocol header to the enhanced FC packets as an outermost header.

16. The non-transitory computer-readable memory medium of claim 14, and further comprising instructions that cause the processor to transmit multiple exchange blocks through the FC network to the destination device without waiting for confirmation that all the enhanced FC packets of a previously transmitted exchange block have been received by the destination device.

17. The non-transitory computer-readable memory medium of claim 14, and further comprising instructions that cause the processor to include in the reliability protocol header an acknowledgement number and a sequence number.

* * * * *